3,457,258
5H-1,4-BENZODIAZEPIN-5-ONES AND -5-THIONES
Arthur A. Santilli, Havertown, Pa., and Thomas S. Osdene, Richmond, Va., assignors to American Home Products Corporation, New York, N.Y., a corporation of Delaware
No Drawing. Filed Oct. 23, 1965, Ser. No. 504,130
Int. Cl. C07d *53/06;* C07c *103/28;* A61k *27/00*
U.S. Cl. 260—239.3           5 Claims

ABSTRACT OF THE DISCLOSURE

This invention relates to certain novel 5H-1,4-benzodiazepin-5-ones and 5H-1,4 - benzodiazepin-5-thiones. These compounds are useful as anti-inflammatory, central nervous system depressant, anti-convulsant and analgesic agents.

---

The invention relates to the synthesis of novel 5H-1,4-benzodiazepin-5-ones, to intermediates in their preparation, and to derivatives thereof.

As determined by standard pharmacological procedures, the final products claimed herein exhibit anti-inflammatory, central nervous system depressant, anti-convulsant, and analgesic activity.

The novel compounds and the the method of the invention are characterized by the following reaction shceme in which reference is made to typical examples which are given hereinafter.

effected by the action of sodium hydride in benzene thus giving IVa. Reduction of IVa by the action of phosphorus pentasulfide in pyridine affords 1-benzyl-1,2,3,4-tetrahydro-5H-benzodiazepin-5-thione (Va).

As shown above, the synthesis of 1,2,3,4-tetrahydro-1-methyl-5H-1,4-benzodiazepin-5-one (IVb) is brought about in the same fashion as the method used in the proparation of IVa. The sequential steps are the same except that the starting material is 2-methylaminobenzamide (Ib). The reaction of Ib with ethylene oxide in acetic acid gives o[methyl(2-hydroxyethyl)amino]benzamide (IIb) which is not easily purified and is therefore allowed to react directly with thionyl chloride to afford o-[methyl(2-chloroethyl)amino]benzamide (IIIb). Ring closure of IIIb affords IVb. Reduction of IVb with lithium aluminum hydride affords 2,3,4,5-tetrahydro-1-methyl-1-H-1,4-benzodiazepine isolated as the dihydrochloride salt (VIb). Thiatio nof IVb with phosphorus pentasulfide affords 1,2,3,4-tetrahydro-1-methyl-5H-1,4-benzodiazepin-5-thione (Vb).

It will be obvious to those skilled in the art of organic chemistry that the benzenoid portion of the intermediate benzamide compounds and, correspondingly, of the final 5H-1,4-benzodiazepin-5-one and 5-thione can be substituted in any position with one or more non-interfering substitutents such as alkyl, halo, haloalkyl, nitro, and the like. Such compounds are fully equivalent to those specifically claimed herein.

The following examples further illustrate specific details of the invention.

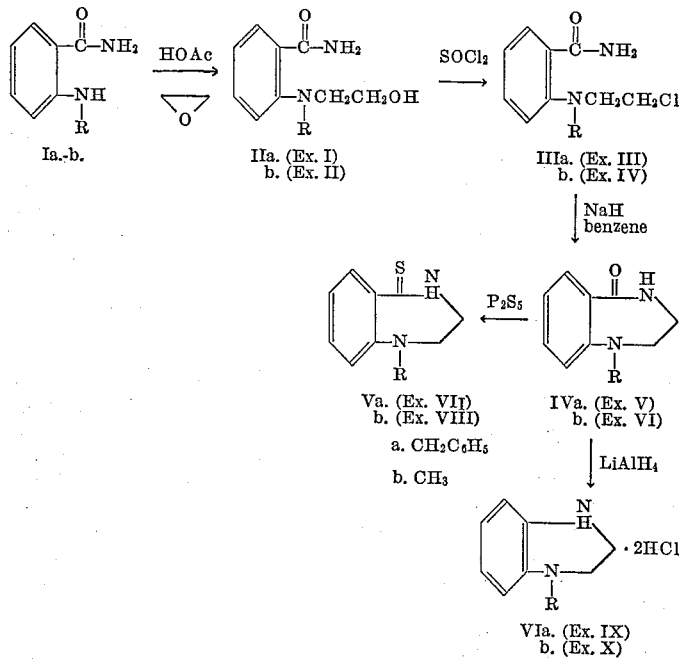

In the above reaction scheme the symbol R represents lower alkyl and lower aralkyl.

The method used for preparing 1-benzyl-1,2,3,4-tetrahydro-5H-1,4-benzodiazepin-5-one (IVa) serves to illustrate the manner in which the invention is best carried out. The reaction of 2-benzylaminobenzamide with an excess of ethylene oxide in acetic acid at room temperature affords o-[benzyl(2-hydroxyethyl)amino]benzamide (IIa). Reaction of IIa with thionyl chloride at ice-bath temperature affords o-[benzyl(2 - chloroethyl)amino] benzamide (IIIa). Cyclodehydrochlorination of IIIa is Example I.—o-[Benzyl(2-hydroxyethyl)amino] benzamide To a stirred solution of 35 ml. of ethylene oxide in 200 ml. of glacial acetic acid was added 25.9 g. of o-benzylaminobenzamide. The reaction mixture was allowed to stir for 72 hours at room temperature after which time the reaction solution was concentrated to one half of its volume in vacuo on a rotary evaporator. The reaction solution was basified with 10% sodium hydroxide solution. The oily phase which was deposited crystallized on cooling and scratching. The crude product amounted to 33.4 g. Recrystallization of the product from ethyl acetate afforded the analytical sample, M.P. 136–137° C.

Example II.—o-[Methyl(2-hydroxyethyl)amino]benzamide

To an ice-cold, stirred solution of 60 ml. of ethylene oxide in 250 ml. of glacial acetic acid was added 30 g. of 2-methylaminobenzamide. The reaction mixture was allowed to stir for 2 hours at ice-bath temperature and then for 72 hours at room temperature. The reaction mixture was concentrated to one half of its volume in vacuo on a rotary evaporator and was then basified with 10% sodium hydroxide solution. The basified solution was extracted four times with 500 ml. portions of ether. The combined ether extracts were dried over magnesium sulfate. After filtration and evaporation to dryness, there was obtained 15.6 g. of an oily product. The water phase was reextracted with two 500 ml. portions of chloroform. The combined chloroform extracts were dried over magnesium sulfate, filtered and evaporated to dryness giving 20.4 g. of an oil. Since the oil fractions from the ether and chloroform extractions were identical as determined by infrared spectral comparison they were combined and dissolved in 150 ml. of chloroform. The chloroform solution was then dried over magnesium sulfate, filtered and evaporated to dryness giving 35.9 g. of product. The material was used directly in Example IV without purification.

Example III.—o-[Benzyl(2-chloroethyl)amino]benzamide

To 50 ml. of thionyl chloride at ice-bath temperature was added with stirring 10.1 g. of o-[benzyl(2-hydroxyethyl)amino]benzamide. The reaction mixture was allowed to stir for 30 hours at room temperature after which time the excess thionyl chloride was removed by evaporation in vacuo. The residue was washed with ethyl acetate and was then dissolved in 150 ml. of water. The resulting solution was filtered free of some water insoluble material. Basification of the filtrate resulted in the deposition of 6.1 g. of product. Recrystallization of the product from benzene-petroleum ether gave the analytical sample, M.P. 82–83° C.

Example IV.—o-[Methyl(2-chloroethyl)amino]benzamide

To 220 ml. of thionyl chloride at ice-bath temperature was added with stirring 35.9 g. of o-[methyl(2-hydroxyethyl)amino]benzamide. The reaction mixture was allowed to stir for 6 hours at ice-bath temperature, then 12 hours at room temperature. The reaction solution was evaporated to dryness in vacuo while maintaining the temperature below 25° C. The resulting solid residue was washed with petroleum ether and was then added to an excess of 10% sodium hydroxide solution. The solid which was deposited out of solution was washed free of alkali and then dried over potassium hydroxide in vacuo. The dried product amounted to 24.1 g., M.P. 87–93° C. Recrystallization from cyclohexane afforded the analytical sample, M.P. 93–94.5° C.

Example V.—1-benzyl-1,2,3,4-tetrahydro-5H-1,4-benzodiazepin-5-one

To a stirred suspension of 0.58 g. of sodium hydride (50% mineral oil dispersion) in 50 ml. of dry benzene was added 2.9 g. of o-[benzyl(2-chloroethyl)amino]benzamide. The reaction mixture was heated under reflux for 1 hour and was then allowed to stand 12 hours at room temperature. The solvent was removed in vacuo. The residue was triturated with 50 ml. of hot petroleum ether and then filtered under suction. The solid thus collected was washed with 25 ml. of water to remove sodium chloride. The product (2.3 g.) was recrystallized from benzene-petroleum ether giving the analytical sample, M.P. 140–142.5° C.

Example VI.—1,2,3,4-tetrahydro-1-methyl-5H-1,4-benzodiazepin-5-one

To a stirred suspension of 4 g. of sodium hydride (50% mineral oil dispersion) in 150 ml. of dry benzene was added dropwise a solution of 16.2 g. of o-[methyl(2-chloroethyl)amino]benzamide in 200 ml. of dry benzene. The reaction mixture was heated under reflux for 3 hours. After allowing the reaction mixture to cool to room temperature, 25 ml. of benzene saturated with water was added. The benzene solution was then washed three times with 100 ml. portions of water. The benzene phase was evaporated to dryness yielding 3.5 g. of residue, M.P. 166–169° C. The aqueous phase was extracted twice with 250 ml. portions of chloroform. The chloroform extracts were combined, dried over magnesium sulfate, filtered and taken to dryness on a rotary evaporator. An additional 2.0 g. of product was obtained, M.P. 165–169° C. Recrystallization of the two fractions from benzene afforded 5.2 g. of product, M.P. 167–168° C.

Example VII.—1-benzyl-1,2,3,4-tetrahydro-5H-1,4-benzodiazepin-5-thione

To a stirred suspension of 1.26 g. of 1-benzyl-1,2,3,4-tetrahydro-5H-1,4-benzodiazepin-5-one in 10 ml. of dry pyridine was added 1.26 g. of phosphorus pentasulfide. The reaction mixture was heated under reflux for 2 hours and was then poured into 200 ml. of boiling water. On cooling, the water solution an oily residue was deposited which crystallized on cooling. Recrystallization of the solid from cyclohexane afforded 0.4 g. of product, M.P. 119.5–120.5° C.

Example VIII.—1,2,3,4-tetrahydro-1-methyl-5H-1,4-benzodiazepin-5-thione

To a stirred suspension of 1.0 g. of 1,2,3,4-tetrahydro-1-methyl-5H-1,4-benzodiazepin-5-one in 10 ml. of dry pyridine was added 1.0 g. of phosphorus pentasulfide. The reaction mixture was heated under reflux for 1 hour and was then poured into 500 ml. of boiling water with stirring. On cooling the reaction mixture there was deposited out of solution 0.7 g. of product, M.P. 153–155° C. Recrystallization from ethanol afforded the analytical sample, M.P. 153.5–154° C.

Example IX.—1-benzyl-1H-2,3,4,5-tetrahydro-1,4-benzodiazepine dihydrochloride monohydrate To a stirred suspension of 2.3 g. of lithium aluminum hydride in 150 ml. of dry tetrahydrofuran was added dropwise a warm solution of 5.0 g. of 1-benzyl-1,2,3,4-tetrahydro-5H-1,4-benzodiazepin-5-one in 125 ml. of tetrahydrofuran. The reaction mixture was heated under reflux for 2 hours. The excess reducing agent was decomposed by the dropwise addition of a 50% aqueous tetrahydrofuran solution. Thirty milliliters of 10% sodium hydroxide solution was then added. The reaction mixture was filtered under suction and the filtrate was dried over magnesium sulfate. The drying agent was removed by filtration and the filtrate was evaporated to dryness on a rotary evaporator. The resulting oily residue was dissolved in benzene and the benzene solution was dried over magnesium sulfate. Filtration and evaporation to dryness gave 4.2 g. of oil. The oil was dissolved in 40 ml. of ethanol. After the introduction of hydrogen chloride gas into the solution and the addition of 80 ml. of acetone a crystalline salt was deposited which amounted to 2.5 g., M.P. 134–140° C. Recrystallization from ethanol-acetone gave the analytical sample, M.P. 134.5–136.5° C.

Example X.—2,3,4,5-tetrahydro-1-methyl-1H-1,4-benzodiazepine dihydrochloride

To a stirred suspension of 1.5 g. of lithium aluminum hydride in 500 ml. of tetrahydrofuran was added 1.09 g.

of 1,2,3,4-tetrahydro-1-methyl - 5H - 1,4-benzodiazepin-5-one. The reaction mixture was heated under reflux for 2 hours. Saturated aqueous sodium sulfate (50 ml.) was added to decompose the excess reducing agent. The reaction mixture was filtered under vacuum and the filtrate was evaporated to dryness. The oily residue was dissolved in 30 ml. of chloroform and the solution was dried over magnesium sulfate. Filtration and evaporation of the filtrate to dryness afforded 0.9 g. of an oil. The dihydrochloride salt was prepared from a methanolic hydrogen chloride solution to which is added acetone to the point of turbidity. The product thus obtained amounted to 0.45 g., M.P. 188–190° C. Recrystallization from methanol-acetone containing hydrogen chloride gas afforded the analytical sample, M.P. 187–188° C.

When the compounds of this invention are employed as anti-inflammatory, central nervous system depressant, anticonvulsant and analgesic agents, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing standard excipients, or in the form of solutions; or they may be injected parenterally, that is intramuscularly, intravenously or subcutaneously. For parenteral administration they may be used in the form of sterile solutions containing other solutes, for example, enough saline or glucose to make the solutions isotonic.

The dosage of the present therapeutic agents will vary with the form of administration and the particular compound chosen. It will generally be found that when the compositions are administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 40 mg. to about 400 mg. per kg. of body weight per day, although as aforementioned variations will occur. However, a dosage level that is in the range of from about 150 mg. to about 300 mg. per kg. of body weight per day is most desirably employed in order to achieve effective results.

What is claimed is:

1. A compound of the formula

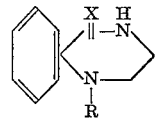

wherein X is sulfur or oxygen and R is lower alkyl or phenyl(lower)alkyl.

2. 1 - benzyl - 1,2,3,4 - tetrahydro - 5H - 1,4 - benzodiazepin-5-one.

3. 1,2,3,4 - tetrahydro - 1 - methyl - 5H - 1,4 - benzodiazepin-5-one.

4. 1 - benzyl - 1,2,3,4 - tetrahydro - 5H - 1,4 - benzodiazepin-5-thione.

5. 1,2,3,4 - tetrahydro - 1 - methyl - 5H - 1,4 - benzodiazepin-5-thione.

References Cited

UNITED STATES PATENTS 3,244,698    4/1966    Uskokovic et al. _____ 260—239.3

OTHER REFERENCES

Santilli et al.: J. Org. Chem., vol. 9, pp. 1998–2003 (1964).

HENRY R. JILES, Primary Examiner

R. T. BOND, Assistant Examiner

U.S. Cl. X.R.

260—239, 558, 559, 999

PO-1050
(5/69)

UNITED STATES PATENT OFFICE
CERTIFICATE OF CORRECTION

Patent No. 3,457,258          Dated July 22, 1969

Inventor(s) Arthur A. Santilli and Thomas S. Osdene

It is certified that error appears in the above-identified patent and that said Letters Patent are hereby corrected as shown below:

Columns 1-2, lines 30-60, formula IV should appear as follows:

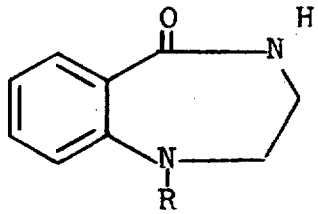

formula V should appear as follows:

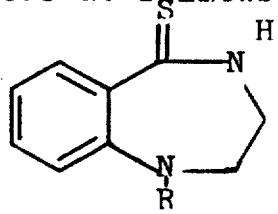

and formula VI should appear as follows:

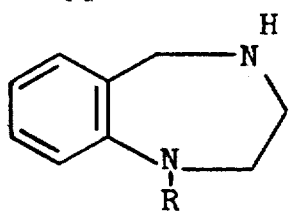

Column 6, lines 10-14, the formula should appear as follows:

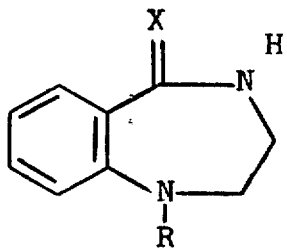

Signed and sealed this 7th day of April 1970.

(SEAL)
Attest:

EDWARD M. FLETCHER, JR.
Attesting Officer

WILLIAM E. SCHUYLER, JR.
Commissioner of Patents